May 10, 1932.     M. B. HAMMOND     1,857,635
AUTOMOBILE BUMPER
Filed April 27, 1931
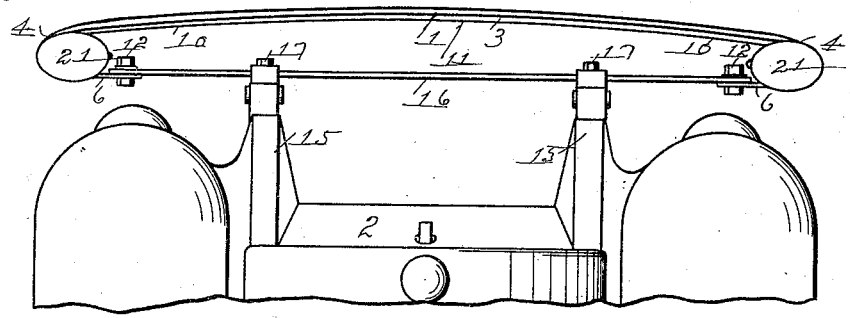
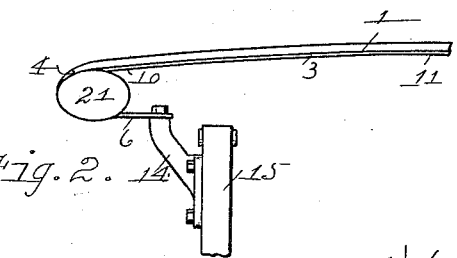
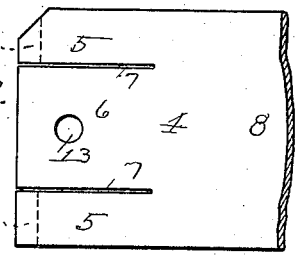
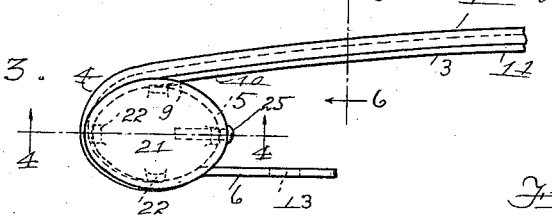
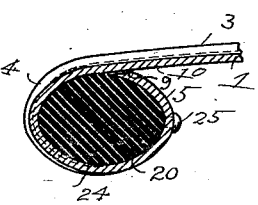
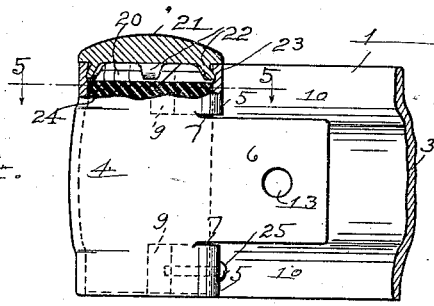
Witness:
Geo L. Chapel
INVENTOR:
Milton B. Hammond
BY
Rice and Rice
ATTORNEYS Patented May 10, 1932

1,857,635

UNITED STATES PATENT OFFICE

MILTON B. HAMMOND, OF GRAND RAPIDS, MICHIGAN, ASSIGNOR TO WOLVERINE BUMPER & SPECIALTY COMPANY, OF GRAND RAPIDS, MICHIGAN, A CORPORATION OF MICHIGAN

AUTOMOBILE BUMPER

Application filed April 27, 1931. Serial No. 533,119.

The present invention relates to bumpers for automobiles and the like; and an object thereof is to provide a device of that character having improved cushioning parts for the impacts thereon; another object is to provide such a device having improved parts for mounting the same on an automobile; another object is to provide such a device which shall be very simple and economical in construction and efficient in operation.

These and any other and more specific objects hereinafter appearing are attained by, and the invention finds preferable embodiment in, the structure particularly described in the body of this specification and illustrated by the accompanying drawings, in which:

Figure 1 is a top plan view of an automobile bumper and of the forward end of an automobile on which it is mounted;

Figure 2 is a top plan view of portions thereof showing a modified construction of the mounting means;

Figure 3 is a top plan view of an end portion of the bumper;

Figure 4 is an elevational rear view of said end portion, partially sectioned vertically on line 4—4 of Figure 3;

Figure 5 is a horizontal sectional view thereof taken on line 5—5 of Figure 4;

Figure 6 is a vertical sectional view of the same taken on line 6—6 of Figure 3; and Figure 7 is a rear side view of the end portion of a blank or metal strip from which the bumper is made.

The bumper designated generally 1, shown in these drawings mounted on an automobile 2, comprises a resilient horizontal impact bar 3 whose end portions 4 are divided into parts 3 or tongues 5, 6 as by horizontal slits 7 extending from the ends of the metal strip or "blank" 8 from which the bar 3 is formed, as shown in Figure 7. These end portions 4 are curled rearwardly and inwardly, and the tongues 5 thereof are then curled forwardly and outwardly so that their bevelled extremities 9 extend parallelly and in contact with the rear surface 10 of the middle portion 11 of the impact bar, the other tongue 6 extending inwardly and in approximately parallel relation with said middle portion 11 to form the part of the bar whereby the same is mounted on the automobile, as by bolts 12 passing through openings 13 in these mounting parts and carried by brackets 14 on the frame 15 of the automobile (as shown in Figure 2), or passing through the horizontal supporting rear bar 16 secured at 17 on said frame (as seen in Figure 1).

When the front of the bar 3 receives an impact its inner surface contacting the bevelled ends 9 of the bar's resilient tongues 5 flexes these tongues thus cushioning the impact at this contacting point, said bevelled end 9 sliding slightly along the bar's inner surface 10 in such flexing. This cushioning action is made more effective where the end portions 4 of the impact bar are curled in the form of an ellipse having its shortest diameter extending forwardly-rearwardly as shown in the views.

The upwardly-downwardly extending space 20 surrounded by the curled tongues 5 is desirably covered by a top cap 21 held in place as by clips 22 whose ends engage in an annular recess 23 in the tongue 5.

The said space is shown filled by a resilient member or rubber plug 24, held in place as by a pin 25, to deaden the sound caused by the frictional engagement of the end 9 with the bar's surface 10, and also to cushion impacts on the bar.

The invention being intended to be pointed out in the claims, is not to be limited to or by details of construction of the particular embodiment thereof illustrated by the drawings or hereinbefore described.

I claim:

1. In an automobile bumper: a bar having rearwardly extending end portions curved in a horizontal plane, comprising tongues continuously curved toward the bar, and mounting tongues extending approximately parallel with the bar intermediate its end portions.

2. In an automobile bumper: a bar having rearwardly extending end portions curved in a horizontal plane, comprising tongues continuously curved to bearing relation with the bar, and mounting tongues extending approximately parallel with the bar intermediate its end portions.

3. In an automobile bumper: a bar having rearwardly extending end portions elliptically curved in a horizontal plane, comprising tongues continuously curved toward the bar, and mounting tongues extending approximately parallel with the bar intermediate its end portions.

4. In an automobile bumper: a bar having rearwardly extending end portions elliptically curved in a horizontal plane with shortest diameters extending forwardly-rearwardly, and comprising tongues continuously curved toward the bar, and mounting tongues extending approximately parallel with the bar intermediate its end portions.

5. In an automobile bumper: a bar having rearwardly extending end portions curved in a horizontal plane, comprising tongues continuously curved toward the bar, and mounting tongues extending approximately parallel with the bar intermediate its end portions; caps covering said end portions edgewise parallel with the vertical sides thereof.

6. In an automobile bumper: a bar having rearwardly extending end portions curved in a horizontal plane, comprising tongues continuously curved toward the bar, and mounting tongues extending approximately parallel with the bar intermediate its end portions; resilient plugs surrounded by said end portions.

In testimony whereof I have hereunto set my hand at Grand Rapids, Michigan this 23rd day of April, 1931.

MILTON B. HAMMOND.